(12) United States Patent
Nicholson et al.

(10) Patent No.: US 6,631,519 B1
(45) Date of Patent: Oct. 7, 2003

(54) AUTOMATED SCHEMA AND INTERFACE GENERATION

(75) Inventors: Andrew L. Nicholson, Duvall, WA (US); Michael J. Glass, Woodinville, WA (US); David S. Kosbie, Redmond, WA (US); Thomas A. Vaughan, Seattle, WA (US)

(73) Assignee: Microsoft Corporation, Redmond, CA (US)

(*) Notice: Subject to any disclaimer, the term of this patent is extended or adjusted under 35 U.S.C. 154(b) by 0 days.

(21) Appl. No.: 09/539,251

(22) Filed: Mar. 30, 2000

(51) Int. Cl.[7] ................................................. G06F 9/44
(52) U.S. Cl. ..................... 717/169; 717/169; 717/170; 707/102
(58) Field of Search .................. 717/100–118, 168–178; 707/1–5, 101–110; 704/201

(56) References Cited

U.S. PATENT DOCUMENTS

| | | | | |
|---|---|---|---|---|
| 5,495,567 A | * | 2/1996 | Lizawa et al. ............... | 345/762 |
| 5,550,971 A | * | 8/1996 | Brunner et al. ................ | 707/3 |
| 5,920,725 A | * | 7/1999 | Ma et al. ..................... | 717/171 |
| 5,970,490 A | * | 10/1999 | Morgenstern ................ | 707/10 |
| 6,012,067 A | * | 1/2000 | Sarkar ......................... | 707/103 |
| 6,289,382 B1 | * | 9/2001 | Bowman-Amuah ......... | 709/226 |
| 6,349,302 B1 | * | 2/2002 | Aoyama et al. ............. | 707/101 |
| 6,430,556 B1 | * | 8/2002 | Goldberg et al. ............. | 707/4 |

* cited by examiner

Primary Examiner—Anil Khatri
Assistant Examiner—Chuck Kendall
(74) Attorney, Agent, or Firm—Workman, Nydegger

(57) ABSTRACT

Automated generation of schema and interface methods is described. The system receives a schema definition file, which in one aspect of the system is an XML file. The system parses the schema definition file into an internal representation comprising collection classes. A SQL generator traverses the collection classes and generates SQL statements that define tables, views and stored procedures. A component generator traverses the collection classes and generates computer program source code implementing components that access properties defined in the schema definition data, and methods that provide for persistent storage of the objects in a database.

16 Claims, 3 Drawing Sheets

AUTOMATED SCHEMA AND INTERFACE GENERATION

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright©2000, Microsoft Corporation, All Rights Reserved.

FIELD

This invention relates generally to software development environments, and more particularly to automatically generating schemas and schema interface methods.

BACKGROUND

Over time computer software systems and the software programming languages used to develop them have become more complex. Software systems typically comprise many different source code files, and the system must typically interface with multiple components. For example, a system can require access to a database component, a file system component, a network interface component etc. Each of these components have published interfaces defining the methods and properties for the component. The system must be coded in accordance with these interfaces in order to function properly.

In addition, a typical software system undergoes many changes during its life cycle. This is especially true during the development phase of a system. With each change, there is the possibility that the change will result in an incompatibility with another component or module. For example, if a component interface is changed, it is likely that every instance of a call to the interface will also have to be changed in order for the system to function properly. If the data model used by the system changes, references to objects and properties defined by the data model will also have to be changed.

The situation is further complicated when database interfaces are considered. Here, there are two types of potential incompatibility. First, there is the problem discussed above related to interfaces. If the database interface changes, each of the modules calling the interface must also be changed. Second, the database data definition can also change. For example, a database administrator or user may alter the definition of one or more tables in the database by adding, deleting or renaming tables and columns in the database. These changes can result in errors in the system if the changes are not reflected in the components and modules accessing the database because the data model in the system does not match the data model in the database.

Problems of this second type can be more difficult to debug, because they generally do not occur until the system is run. It is generally the case that problems that occur at run-time are more costly to debug and fix than problems that can be found earlier in the process, such as when the system is designed, compiled, or built.

The problems discussed above are compounded for large projects having many software developers designing and modifying code for the system. Often one set of developers will make changes to one module or component without being aware of the impact on other modules and components.

As can be seen from the above, there is a need in the art for a system that allows software developers to reduce the possibility of errors caused by inconsistent interface and data model definitions. The system should be able to automatically generate interface definitions and provide for instantiating objects in a run-time environment that match objects in a database.

SUMMARY

The above-identified problems, shortcomings and disadvantages with the prior art, as well as other problems, shortcoming and disadvantages, are solved by the present invention, which will be understood by reading and studying the specification and the drawings.

One aspect of the system according to one embodiment is that schemas and interfaces are automatically generated. The system receives a schema definition file, which in one aspect of the system is an XML file. The system parses the schema definition file into an internal representation comprising collection classes. An SQL generator traverses the collection classes and generates SQL statements that define tables, views and stored procedures. A component generator traverses the collection classes and generates computer program source code implementing components that access properties defined in the schema definition data, and methods that provide for persistent storage of the objects in a database.

A further aspect of the system is that a variant of SQL known in the art as Transact-SQL (T-SQL) is generated. T-SQL provides for standard SQL operations such as the creation of tables, views and stored procedures. In addition, T-SQL provides the capability of initializing column data in the database.

A still further aspect of the system is that the component generator generates C++ and IDL code that conforms to the Component Object Model (COM). The interfaces and methods provided in the components implement accessors to properties for objects defined in the schema definition data. In addition, the components provide interfaces to persist the objects and their properties in the database.

The invention includes systems, methods, computers, and computer-readable media of varying scope. Besides the embodiments, advantages and aspects of the invention described here, the invention also includes other embodiments, advantages and aspects, as will become apparent by reading and studying the drawings and the following description.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed. description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, a system of according to one embodiment of the invention is presented. In the third section, a method in accordance with an embodiment of the invention is provided. Finally, in the fourth section, a conclusion of the detailed description is provided.

Hardware and Operating Environment

Figure 1:
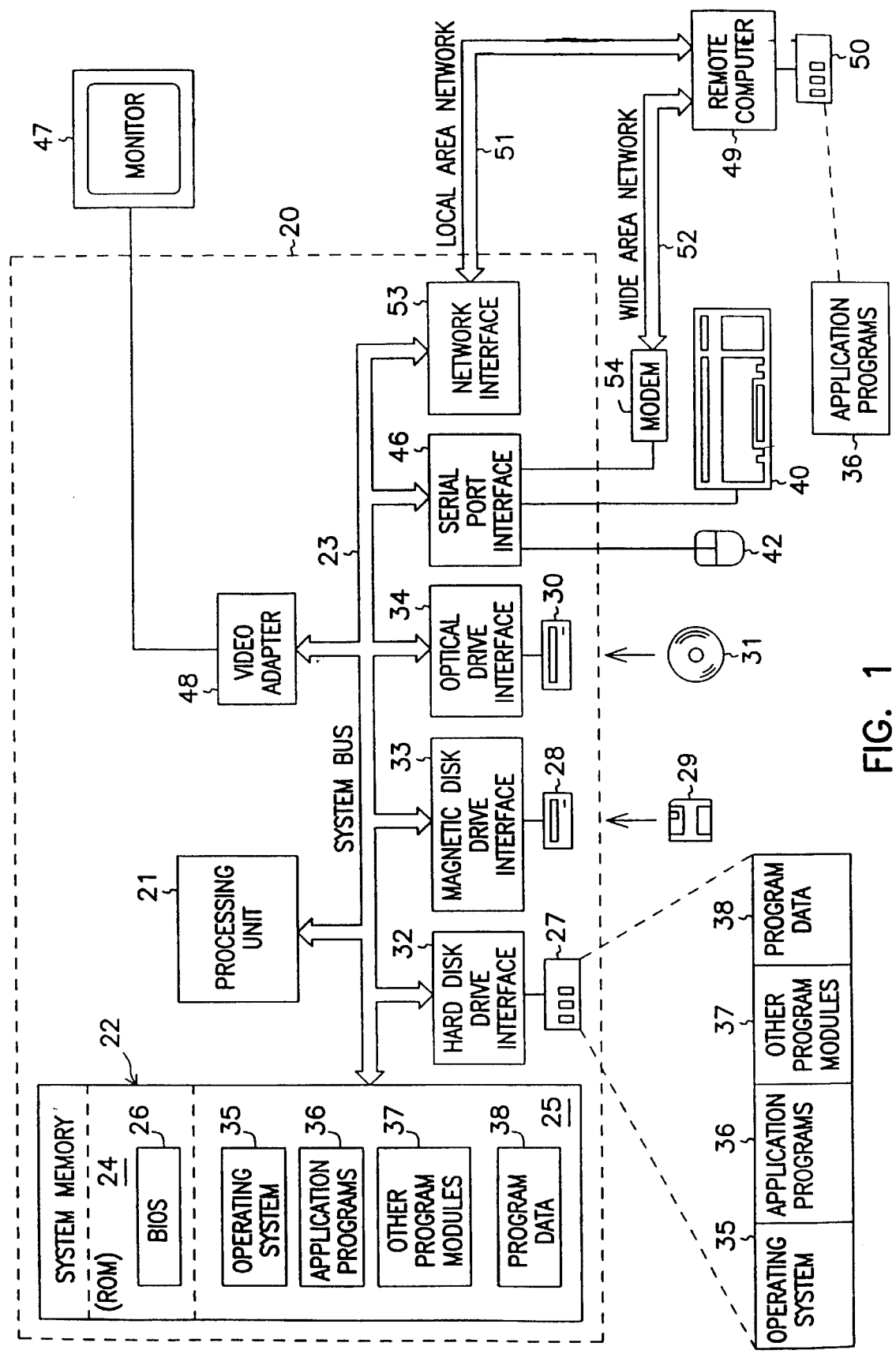
FIG. 1 shows a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 20. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, can be connected to the system bus 23 via the serial port interface 46. In addition, the modem 54 can be connected to the system bus 23 via a USB or parallel port interface. Furthermore, other mechanisms for providing a network interface to connect a computer to a network are known in the art. The invention is not limited to any particular method of providing a network connection. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Overview

Figure 2:
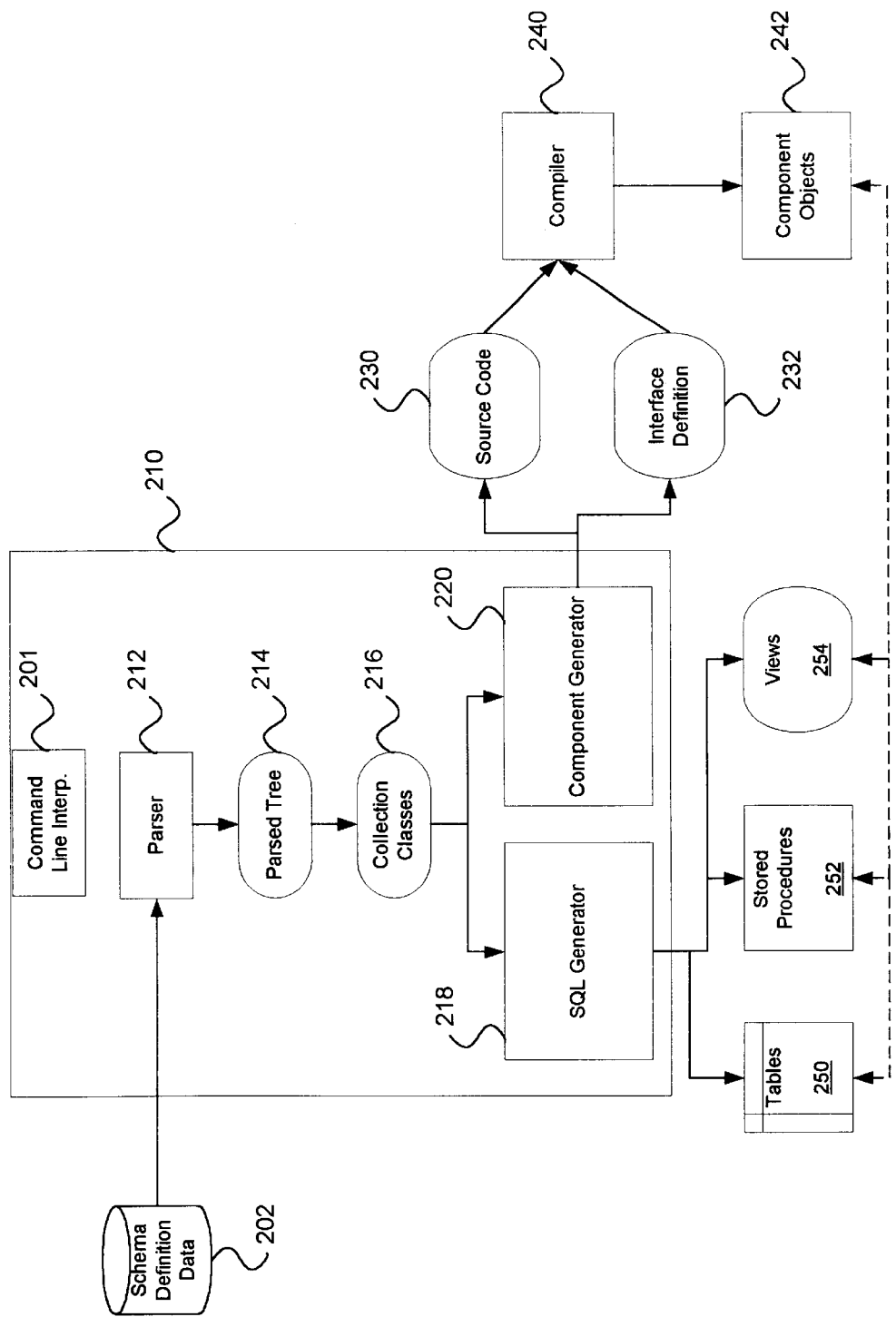
FIG. 2 shows a block diagram of a system according to one embodiment of the invention.

In this section of the detailed description, a description of a computerized system according to an embodiment of the invention is provided. The description is provided by reference to FIG. 2, in which a system according to an embodiment of the invention includes a schema generation tool 210. As shown, the schema generator 210 includes a command line interpreter 201, parser 212, SQL generator 218, and component generator 220. Those of ordinary skill within the art will appreciate that the schema generation tool 210 can also include other components, not shown in FIG. 2; only those parts necessary to describe the invention in an enabling manner are provided.

Command line interpreter 201 provides a mechanism for the schema generator 210 to receive a command line from either a user or a script. Providing a command line interpreter instead of, or in addition to, a graphical user interface allows the schema generator 210 to be run as part of a scripted build process without requiring user intervention. The input file or files and any special processing can be designated on the command line, as is known by those of skill in the art.

Schema generator 210 receives schema definition data 202 as input, and produces multiple outputs. The output from schema generator 210 includes tables 250, stored procedures 252, views 254, source code 230 and interface definitions 232. Schema definition data 202 defines the data types and data structures that are to be generated as a unit. In addition, schema definition data 202 can include instructions defining interactions between data structures or business rules related to the data structures. Schema definition data 202 can be expressed in any language capable of defining data types, data structures and relationships. In one embodiment of the invention, the XML (eXtensible Markup Language) is used to define the schema definition data. An exemplary XML schema definition data file is shown in Appendix A of the specification. The parser 212 of schema generator 210 receives the schema definition data 202 and parses it into a parse tree 214. In one embodiment of the invention, the parser is capable of parsing the XML language, and generates a standard XML parse tree. In a further embodiment of the invention, the parser is the XML parser provided as part of the Internet Explorer product from Microsoft Corporation. However, the invention is not limited to any particular parser or parser implementation. In addition, the invention is not limited to any particular parse tree structure.

Schema generator 210 scans the parse tree 214, and creates collection classes 216 from the information in the parse tree. The collection classes 216 contain schema objects that represent classes, views and sprocs (stored procedures). It is desirable that the objects in the collection classes 216 are in dependency order. This allows the generator components to ensure that entities are generated in the proper order, that is, before they are referenced by subsequent entities. For example, if an object in class "B" references an object in class "A", definitions for class A will appear in the collection before definitions for class B. In one embodiment of the invention, the source schema definition data 202 presents the information in dependency order, and the parser 212 preserves the order.

SQL generator 218 is a component of schema generator 210 that scans the collection classes 216, examining each object and where appropriate, generating a SQL entity for the object. The SQL entities generated include table definitions 250, stored procedures 252, and views 254. Table definitions 250 include SQL statements that are used to create tables in a database. The table definitions define the columns and data types for the columns that comprise the various tables generated by the SQL generator. Stored procedures 252 include SQL statements that define SQL procedures that can be stored in the database, and executed by a database management system. Stored procedure techniques are known in the art. Views 254 comprise SQL statements that define views of tables in a database. A view, as is known in the art, defines a set of columns from one or more tables that can be treated as a unit. An exemplary table definition produced by one embodiment of the invention is shown in Appendix B of the specification. The exemplary table definition assumes that the input is the schema definition shown in Appendix A.

In addition to defining tables 250, the SQL generator 218 also ensures that any linkages between schema objects in schema definition data 202 are preserved. This is accomplished by creating the correct foreign key relationships for objects that reference one another. In addition, the SQL generator 218 will create auxiliary table definitions when necessary to represent multi-valued properties from the schema definition data.

In one embodiment of the invention, the SQL generator 218 generates a variant of SQL known as Transact-SQL (T-SQL). T-SQL is a scripting language used to manipulate SQL compatible databases. T-SQL supports standard SQL operations, such as creating, modifying, and removing tables in a database. T-SQL adds the ability to insert, update and remove columns within the database. In other words, T-SQL adds the ability to initialize and manipulate actual data in the database.

Component generator 220 of schema generator 210, like schema generator 218 also examines collection classes 216 as input. Component generator 220 examines each object in the collection classes 216 and generates source code 230 and interface definition 232. Source code 230 comprises a text description of a computer program suitable for compiling by compiler 240. In one embodiment of the invention, the source code 230 comprises code in the C++ language, including ".h" and ".cpp" files as is known in the art. However, the invention is not limited to any particular programming language, and in alternative embodiment of the invention, the source code can be in the C, Java, Smalltalk, Pascal or Visual Basic programming languages.

Source code 230 includes definitions of interface methods that provide accessor methods to the properties and objects defined in the schema. In addition, the source code includes interfaces to methods that manipulate objects in the database that are persistent versions of the schema objects defined in the schema definition data. For example, methods are defined in the source code 230 that read, write, and modify rows in tables created via the SQL generator 218. Appendix C illustrates an exemplary source code ".h" file produced using the schema definition shown in Appendix A.

Component generator 220 also generates an interface definition file 232. The interface definition file contains the definitions of the interfaces and data that a client application uses to interface with a component. In one embodiment of the invention, the interface file is generated using the IDL (Interface Definition Language) from Microsoft Corporation. Appendix D illustrates two exemplary IDL files produced by an embodiment of the invention using the schema definition shown in Appendix A.

The source code 230 and the interface definition 232 are input to compiler 240, which translates the input files to object code modules defining component objects 242. In one embodiment of the invention, the component objects 242 are COM (Component Object Model) components. As shown by the dashed lines in FIG. 2, the component objects 242 provide run-time interfaces that manipulate data objects and stored procedures persisted in a databases as defined by tables 250, stored procedures 242 and views 254.

Procedural functionality, such as business rules defined in the schema definition data 202 can be implemented either in stored procedures 252, or as instructions in the source code 230. Logic in the SQL generator 218 and component generator 220 determines where the procedural functionality will be expressed. If it is more efficient to place the functionality in a stored procedure, the SQL generator 218 will create the required stored procedure, and the component generator 220 will generate code to invoke the stored procedure through an appropriate database API call. Otherwise, the procedural functionality will be placed in the source code 230 along with calls to the database API as necessary.

Thus, at run-time, an application can use the interfaces provided by component objects 242 to manipulate objects in memory, read objects from a database, and write or modify objects back to the database. Because the interface methods and properties in the components are generated from the same source as the database table definitions themselves, there is no chance for incompatibility between the object methods and properties in the components and the data objects in the database. As an example, assume the schema definition data contains the definition of an object "Foo", with properties "x", "y", and "z". The SQL generator 218 will produce a table having x, y, and z as columns. The component generator 220 will generate C++ and IDL code that provides an interface to read, write and update rows from in the table. At run-time, an application uses the interface methods to read row data from the x, y and z columns and populate an object in memory having x, y, and z properties that correspond to the columns. The application can manipulate the data in the objects using the accessor methods generated by the system, and then call an interface method generated by the system to update the row in the database. Should an application developer desire to rename a column, all that needs to take place is to modify the name in the schema definition data and re-run the schema generator. The schema generator will ensure that the interfaces, properties and methods in the components made available for use by an application will be compatible with the database objects.

Method

In the previous section, a system level overview of the operation of an exemplary embodiment of the invention was described. In this section, the particular methods of the invention performed by an operating environment executing an exemplary embodiment of the invention are described by reference to a flowchart shown in FIG. 3. The methods to be performed by the operating environment constitute computer programs made up of computer-executable instructions. The programs are desirably storable on a computer-readable medium such as a floppy disk or a CD-ROM, for distribution and installation and execution on another (suitably equipped) computer. Describing the methods by reference to a flowchart enables one skilled in the art to develop such programs including such instructions to carry out the methods on suitable computers (the processor of the computer executing the instructions from computer-readable media). The methods illustrated in FIG. 3 are inclusive of the acts required to be taken by an operating environment executing an exemplary embodiment of the invention.

Figure 3:
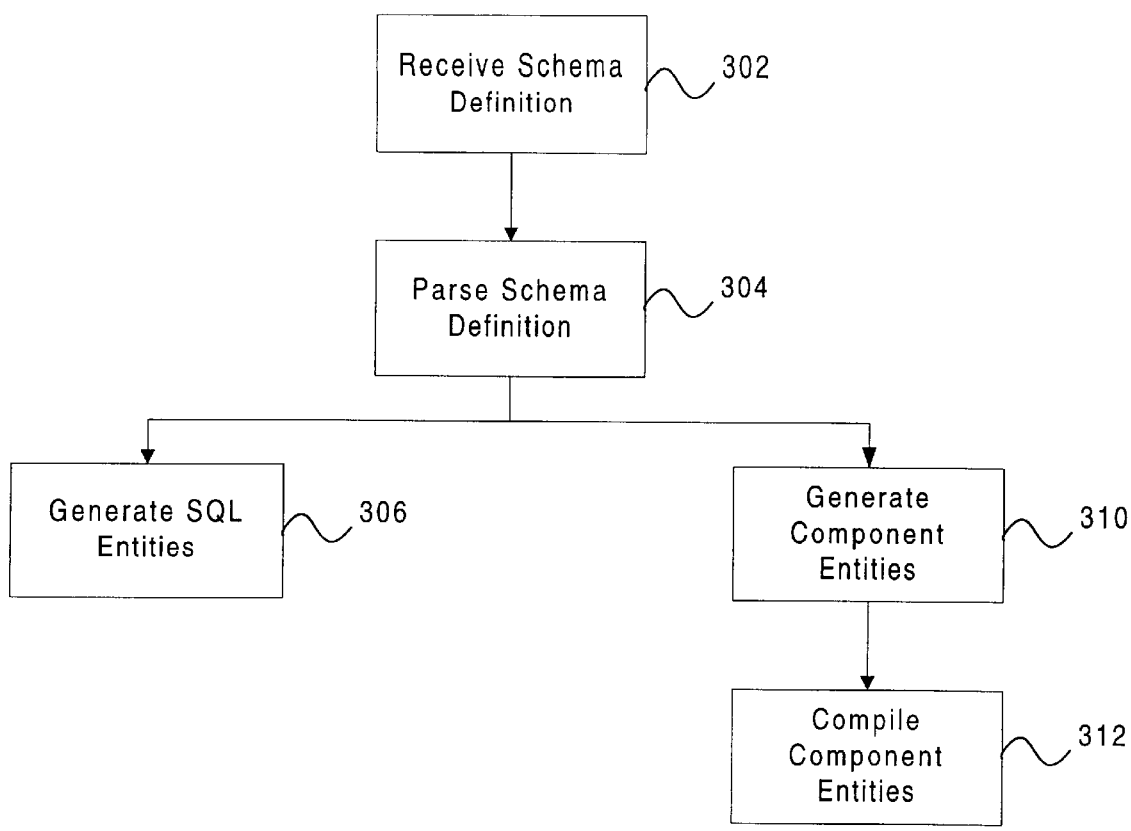
FIG. 3 shows a flowchart illustrating a method according to an embodiment of the invention.

FIG. 3 shows a flowchart of a method 300 according to one embodiment of the invention. A system executing the method, such as schema generator 210 (FIG. 2) begins by receiving schema definition data (block 302). In one embodiment of the invention, the schema data is received from a file. However, the invention is not so limited, and in alternative embodiments of the invention, the schema data can be received from a database, a message queue, or other data source, as known in the art.

The schema definition data, in an embodiment of the invention, is expressed in the XML language. However, the invention is not limited to XML, and any data definition format that provides the capability for defining data types, data structures, and relationships between data structures can be used and is within the scope of the invention.

After receiving the schema definition data, the system executing the method parses the schema definition data according to the format of the data (block 304). As noted above, one embodiment of the invention receives XML data, and the parsing is performed according to the XML standard to create a parse tree containing objects parsed from the input data. In an alternative embodiment of the invention, the parse tree is traversed, and collection classes are created. The collection classes contain objects that represent various entities that can be represented in the schema definition data. For example, the collection classes can include table objects, stored procedure objects and view objects. While the collection class objects can be direct representations of the entities in the schema definition data, the invention is not so limited. For example, the collection classes can contain objects that can be inferred from the schema definition data. In one embodiment of the invention, the collection class objects are ordered such that objects of a first class that are referenced by objects in a second class appear first in the-collection classes. In an alternative embodiment, the collection class objects are organized such that their dependencies as represented in the schema definition data are preserved in the traversal of the objects.

After the schema definition data has been parsed, SQL and component entities are generated (blocks 306 and 310 respectively). As indicated by the horizontal line in the flow chart, the generation of these entities can take place independently of one another, and they can take place in any order. The SQL entities generated include table and view definitions that allow data structures represented in the input schema definition data to be persisted to a database. Also included are stored procedure definitions that can implement business rules defined in the schema definition data.

In one embodiment of the invention, the component entities generated include C++ source code (including both ".cpp" and ".h" files) and IDL files. The C++ source code implements a component interface between an application and the schema objects stored in a database according to the tables created as a result of the SQL generation action in block 306. In addition, the C++ source code implements business rules found in the schema definition data that are not implemented as stored procedures. The IDL files define the interface between an application and the components that are implemented by the C++ source code. The invention is not limited to generating C++ and IDL, and in alternative embodiments of the invention, the component entities can be generated in other programming and interface definition languages such as C, Java, Pascal, Smalltalk, Visual Basic, etc.

Finally, the IDL and C++ source code is compiled into object code by a suitable compiler (block 312). After the source code has been compiled, it can be linked or built into an application that uses the component to access properties in a schema object, and to read, write, and modify schema objects that are persisted in the database.

Conclusion

An automated schema and interface generation system has been described. As can be seen from the discussion above, the system provides advantages not found in previous systems. The systems and methods provide an efficient mechanism to maintain compatibility between objects in a database and the software interfaces used to read, write and update those objects. The system reduces the need to make multiple changes when an object definition changes by providing a single schema definition and automatically propagating changes in the schema definition to both database definitions and component interface source code.

Although specific embodiments have been illustrated and described herein, it will be appreciated by those of ordinary skill in the art that any arrangement which is calculated to achieve the same purpose may be substituted for the specific embodiments shown. For example, while the system has been described as interfacing with a relational database, the systems and methods can be applied to object oriented databases or other systems that have entities that can be expressed in a data definition language. In addition, the system and methods above have been discussed in the context of the Component Object Model. However, the systems and methods can be applied to other component models, such as the Java beans model. This application is intended to cover any adaptations or variations of the present invention. Therefore, it is manifestly intended that this invention be limited only by the following claims and equivalents thereof.

```
<EX_SCHEMA>
    <CLASS_SCHEMA IS_BASE_TYPE="TRUE">
        <NAME>Integer</NAME>
        <DESCRIPTION>An integer value.</DESCRIPTION>
        <COM_TYPE>VT_I4</COM_TYPE>
        <SQL_TYPE>integer</SQL TYPE>
    </CLASS_SCHEMA>
    <CLASS_SCHEMA IS_BASE_TYPE="TRUE">
        <NAME>String</NAME>
        <DESCRIPTION>Unicode text string.</DESCRIPTION>
        <COM_TYPE>VT_BSTR</COM_TYPE>
        <SQL_TYPE>ntext</SQL_TYPE>
    </CLASS_SCHEMA>
    <CLASS_SCHEMA IS_BASE_TYPE="TRUE">
        <NAME>Boolean</NAME>
        <DESCRIPTION>A boolean value.</DESCRIPTION>
        <COM_TYPE>VT_BOOL</COM_TYPE>
        <SQL_TYPE>bit</SQL_TYPE>
    </CLASS_SCHEMA>
    <CLASS_SCHEMA>
        <NAME>CoreObject</NAME>
        <DESCRIPTION>An Example Core Object</DESCRIPTION>
        <IID>416E6479-4E69-6368-6F6C-736F6C414C4E</IID>
        <ATTRIBUTE_SCHEMA IS_SINGLE_VALUED="TRUE">
            <NAME>Guid</NAME>
            <DESCRIPTION>The unique identifier</DESCRIPTION>
            <TYPE>String</TYPE>
        </ATTRIBUTE_SCHEMA>
        <ATTRIBUTE_SCHEMA IS_SINGLE_VALUED="TRUE">
            <NAME>FriendlyName</NAME>
            <DESCRIPTION>The friendly name</DESCRIPTION>
            <TYPE>String</TYPE>
        </ATTRIBUTE_SCHEMA>
        <ATTRIBUTE_SCHEMA IS_SINGLE_VALUED="TRUE">
            <NAME>URL</NAME>
            <DESCRIPTION>The URL</DESCRIPTION>
            <TYPE>String</TYPE>
        </ATTRIBUTE_SCHEMA>
    </CLASS_SCHEMA>
    <CLASS_SCHEMA>
        <NAME>LearningObject</NAME>
        <DESCRIPTION>An Example Learning Object</DESCRIPTION>
        <IID>544F4d56-4100-2B2B-0044-4B4F53424945</IID>
        <ATTRIBUTE_SCHEMA IS_SINGLE_VALUED="TRUE">
        <NAME>Alias</NAME>
        <DESCRIPTION>The Alias</DESCRIPTION>
        <TYPE>String</TYPE>
    </ATTRIBUTE_SCHEMA>
    <ATTRIBUTE_SCHEMA IS_SINGLE_VALUED="TRUE">
        <NAME>Name</NAME>
        <DESCRIPTION>The Name</DESCRIPTION>
        <TYPE>String</TYPE>
    </ATTRIBUTE_SCHEMA>
    <ATTRIBUTE_SCHEMA IS_SINGLE_VALUED="TRUE">
        <NAME>HomePage</NAME>
        <DESCRIPTION>The Homepage</DESCRIPTION>
        <TYPE>CoreObject</TYPE>
    </ATTRIBUTE_SCHEMA>
    <ATTRIBUTE_SCHEMA>
        <NAME>OtherPages</NAME>
        <DESCRIPTION>some other objects associated with this Learning Object.</DESCRIPTION>
        <TYPE>CoreObject</TYPE>
        </ATTIUBUTE_SCHEMA>
            <METHOD_SCHEMA>
                <NAME>GetHomePageURL</NAME>
                <DESCRIPTION>Returns the absolute URL of the Learning Object home page.</DESCRIPTION>
                    <METHOD_PARAM TYPE="OUT" RETVAL="TRUE">
                        <NAME>URL</NAME>
                            <DESCRIPTION>URL of the HomePage</DESCRIPTION>
                    </METHOD_PARAM>
                <METHOD_SCHEMA>
    </CLASS_SCHEMA>
</EX_SCHEMA>
```

```
/************************************************************************
**
** Auto-Generated T-SQL Script
**
** This file created by the GenSchema tool.
**
************************************************************************/
/************************************************************************
**
**       CoreObject
**
************************************************************************/
CREATE TABLE _CoreObject (
    _Id char(36) NOT NULL PRIMARY KEY,
    _Guid ntext NULL,
    _FriendlyName ntext NULL,
    _URL ntext NULL
)
GO
/************************************************************************
**
**       LearningObject
**
************************************************************************/
CREATE TABLE _LearningObject (
    _Id char(36) NOT NULL PRIMARY KEY,
    _Alias ntext NULL,
    Name ntext NULL,
    _HomePage char(36) NULL
)
GO
CREATE TABLE _LearningObject_OtherPages (
    _LearningObject char(36) NOT NULL FOREIGN
    KEY REFERENCES
_LearningObject(_Id),
    _OtherPages char(36) NOT NULL
)
GO
```

```
/************************************************************************
**
**   Auto-generated header for Example Schema objects
**
************************************************************************/
///////////////////////////////////////////////////////////////////////////
//   CExampleCoreObject
//   @class OLE DB accessor code for the Example Schema CoreObject object.
//
class CdboCoreObjectAccessor
{
public:
    TCHAR m__Id[37];
    TCHAR m__Guid[1024];
    TCHAR m__FriendlyName[1024];
    TCHAR m__URL[1024];
BEGIN_COLUMN_MAP(CdboCoreObjectAccessor)
    COLUMN_ENTRY(1, m__Id)
    COLUMN_ENTRY(2, m__Guid)
    COLUMN_ENTRY(3, m__FriendlyName)
    COLUMN_ENTRY(4, m__URL)
    END_COLUMN_MAP( )
    DEFINE_COMMAND(CdboCoreObjectAccessor, _T("\
    SELECT
        _Id, \
        _Guid, \
        _FriendlyName, \
        _URL \
        FROM dbo._CoreObject"))
    // You may wish to call this function if you are inserting a record and wish to
    // initialize all the fields, if you are not going to explicitly set all of them.
    void ClearRecord( )
    {
        memset(this, 0, sizeof(*this));
    }
```

-continued

```
};
class CdboCoreObject : public CExampledboCommand<CdboCoreObjectAccessor>
{
};
////////////////////////////////////////////////////////////////////////////////
//
//   CExampleCoreObject
//   @class COM representation of the Example Schema CoreObject object.
//
//   @base public | CExampleObjectBase
//
////////////////////////////////////////////////////////////////////////////////
class ATL_NO_VTABLE CExampleCoreObject:
    public CComObjectRootEx<CComSingleThreadModel>,
    public CComCoClass<CExampleCoreObject, &CLSID_ExampleCoreObject>,
    public IDispatchImpl<IExampleCoreObject, &IID_IExampleCoreObject,
&LIBIDExampleOMLib>,
    public ISupportErrorInfoImpl<&IID_IExampleCoreObject>,
    public CExampleObjectBase,
    public CNotifyCallback
{
public:
    // ATL macros -----------------------------------------------------------
    CExampleCoreObject( ) throw(CExampleException)
    {
       FCanThrowMex( );
    }
    ~CExampleCoreObject( ) throw( )
       {
       FNoThrow( );
       // close object store
       Verify(SUCCEEDED(this->CloseObjectStore( )));
       // let object manager know we're going away...
       if (this->GetObjectManagerWEAK( ))
          {
          Verify(SUCCEEDED(this->GetObjectManagerWEAK( )->NotifyDestroy(this-
>GetUnknown( ))));
          }
       }
DEBUG_ATL_DISPATCH(ExampleCoreObject, LIBID_ExampleOMLib)
DECLARE_REGISTRY_RESOURCEID(1)
DECLARE_TRYASSERT_CLASSFACTORY( )
DECLARE_PROTECT_FINAL_CONSTRUCT( )
BEGIN_COM_MAP(CExampleCoreObject)
    COM_INTERFACE_ENTRY(IExampleObjectBase)
    COM_INTERFACE_ENTRY(IExampleObjectPrivate)
    COM_INTERFACE_ENTRY(IExampleCoreObject)
    COM_INTERFACE_ENTRY(IDispatch)
    COM_INTERFACE_ENTRY(ISupportErrorInfo)
END_COM_MAP( )
public:
    // IExampleObjectBase interface -----------------------------------------
    STDMETHOD(Commit)(VOID) throw( );
    STDMETHOD(Restore)(VOID) throw( );
    STDMETHOD(SchemaType)(OUT BSTR * pbstrType) throw( )
       {
       TryOLE
          CheckWritePtr(pbstrType);
          *pbstrType = ::SysAllocString(L"CoreObject");
          if (!pbstrType)
             Throw(E_OUTOFMEMORY);
       CatchReturnOLE(ExampleCoreObject)
       }
    STDMETHOD(Lock_)(IN BSTR bstrIn) throw( )
       {
       FNoThrow( );
       TryOLE
          this->Base_Lock_(bstrIn);
       CatchReturnOLE(ExampleCoreObject)
       }
    STDMETHOD(Lock_)(IN BSTR bstrIn) throw( )
       {
       FNoThrow( );
       TryOLE
          this->Base_Lock_(bstrIn);
       CatchReturnOLE(ExampleCoreObject)
       }
    STDMETHOD(Location)(OUT VARIANT * pvarLocation) throw( )
       {
```

-continued

```
      FNoThrow( );
      TryOLE
         this->Base_Location(pvarLocation);
      CatchReturnOLE(ExampleCoreObject)
      }
   STDMETHOD(Views)(OUT VARIANT * pvarViewObject) throw( )
      {
      FNoThrow( );
      TryOLE
         this->Base_Views(pvarViewObject);
      CatchReturnOLE(ExampleCoreObject)
      }
   STDMETHOD(GetValueByName)(IN BSTR      in_bstr-
                                          Property,
                                          OUT VARIANT
                                          *out_pvar-
                                          Value)
                                          throw( );
   STDMETHOD(PutValueByName)(IN BSTR      in_bstr-
                                          Property,
                                          OUT VARIANT
                                          in_var-
                                          Value)
                                          throw( );
   STDMETHOD(GetXML)(OUT BSTR * pbstrXML) throw( )
      {
      FNoThrow( );
      TryOLE
         this->Base_GetXML(this, pbstrXML);
      CatchReturnOLE(ExampleCoreObject)
      }
   STDMETHOD(SetXML)(IN BSTR bstrXML) throw( )
      {
      FNoThrow( );
      TryOLE
         this->Base_SetXML(this, bstrXML);
      CatchReturnOLE(ExampleCoreObject)
      }
   STDMETHOD(GetXMLPresentation)(OUT BSTR * pbstrXML) throw( )
      {
      FNoThrow( );
      TryOLE
         this->Base_GetXMLPresentation(pbstrXML);
      CatchReturnOLE(ExampleCoreObject)
      }
   // IExampleObjectPrivate interface ---------------------------------------------------------
   STDMETHOD(GetProperties)(OUT BSTR * pbstrProps) throw( )
      {
         FNoThrow( );
         TryOLE
            ::CheckWritePtr(pbstrProps);
               *pbstrProps = ::SysAllocString(L"Guid;FriendlyName;URL;");
               if(!*pbstrProps)
                  Throw(E_OUTOFMEMORY);
         CatchReturnOLE(ExampleCoreObject)
      }
   STDMETHOD(Collection)(IN IExampleOrderedCollection *pIMOCCollection);
   STDMETHOD(CloseObjectStore)( )
      {
         FNoThrow( );
         returnS_OK
      }
   // CNotifyCallback interface ---------------------------------------------------------
   virtual bool Nofify(IN eExampleObjectPropChange eChange,
                                          IN CWSZ
                                          cwszProp-
                                          Name,
                                          IN VARI-
                                          ANT&
                                          rvarNew-
                                          Value)
throw(CExampleException)
      {
      FCanThrowMex( );
      IExampleObjectManager * pimom = this->GetObjectManagerWEAK( );
      Assert(pimom);
      CComBSTR sbstrClass(L"CoreObject");
      CComBSTR sbstrProperty(cwszPropName);
      return (S_OK ==
```

-continued

```
        CheckHresultOLE(pimom->NotifyPropertyChange(this-
>GetUnknown( ),
        sbstClass,
        sbstrProperty,
        eChange,
        &rvarNewValue),
                                                        pimom,
IID_IExampleObjectManager));
        }
    // IExampleCoreObject interface -----------------------------------------------
    STDMETHOD(get_Guid)(OUT VARIANT * pValue) throw( );
    STDMETHOD(put_Guid)(IN VARIANT Value) throw( );
    STDMETHOD(get_FriendlyName)(OUT VARIANT * pValue) throw( );
    STDMETHOD(put_FriendlyName)(IN VARIANT Value) throw( );
    STDMEThOD(get_URL)(OUT VARIANT * pValue) throw( );
    STDMETHOD(put_URL)(IN VARIANT Value) throw( );
private:
    // private member variables ----------------------------
    CComVariant       m_Guid
    CComVariant       m_FriendlyName;
    CComVariant       m_URL;
};
////////////////////////////////////////////////////////////////////////////////
//
//    CExampleLearningObject
//
//    @class OLE DB accessor code for the Example Schema LearningObject object.
//
////////////////////////////////////////////////////////////////////////////////
class CdboLearningObjectAccessor
{
public:
    TCHARm_Id[37];
    TCHAR m_Alias[1024];
    TCHAR m_Name[1024];
    TCHAR m_HomePage[37];
BEGIN_COLUMN_MAP(CdboLearningObjectAccessor)
    COLUMN_ENTRY(1, m_Id)
    COLUMN_ENTRY(2, m_Alias)
    COLUMN_ENTRY(3, m_Name)
    COLUMN_ENTRY(4, m_HomePage)
END_COLUMN_MAP( )
DEFINE_COMMAND(CdboLearningObjectAccessor, _T("\
    SELECT \
        _Id, \
        _Alias, \
        _Name, \
        _HomePage \
        FROM dbo._LearningObject"))
    // You may wish to call this function if you are inserting a record and wish to
    // initialize all the fields, if you are not going to explicitly set all of them.
    void ClearRecord( )
    {
       memset(this, 0, sizeof(*this));
    }
};
class CdboLearningObject : public CExampledboCommand<CdboLearningObjectAccessor>
{
};
////////////////////////////////////////////////////////////////////////////////
//
//    CExampleLearningObject
//
//    @class COM representation of the Example Schema LearningObject object.
//
//    @base public | CExampleObjectBase
////////////////////////////////////////////////////////////////////////////////
class ATL_NO_VTABLE CExampleLearningObject :
    public CComObjectRootEx<CComSingleThreadModel>,
    public CComCoClass<CExampleLearningObject, &CLSID_ExampleLearningObject>,
    public IDispatchImpl<IExampleLearningObject, &IID_IExampleLearningObject,
&LIBID_ExampleOMLib>,
    public ISupportErrorInfoImpl<&IID_IExampleLearningObject>,
    public CExampleObjectBase,
    public CNotifyCallback
    {
    public:
    // ATL macros -----------------------------------------------------------------
    CExampleLearningObject( ) throw(CExampleException)
```

```
    {
      FCanThrowMex( );
    }
    ~CExampleLearningObject( ) throw( )
      {
      FNoThrow( );
      // close object store
      Verify(SUCCEEDED(this->CloseObjectStore( )));
      // let object manager know we're going away...
      if (this->GetObjectManagerWEAK( ))
         {
         Verify(SUCCEEDED(this->GetObjectManagerWEAK( )->Notify-
         Destroy(this-
>GetUnknown( ))));
         }
       }
DEBUG_ATL_DISPATCH(ExampleLearningObject, LIBID_
ExampleOMLib)
DECLARE_REGISTRY_RESOURCEID(1)
DECLARE_TRYASSERT_CLASSFACTORY( )
DECLARE_PROTECT_FINAL_CONSTRUCT( )
BEGIN_COM_MAP(CExampleLearningObject)
    COM_INTERFACE_ENTRY(IExampleObjectBase)
    COM_INTERFACE_ENTRY(IExampleObjectPrivate)
    COM_INTERFACE_ENTRY(IExampleLearningObject)
    COM_INTERFACE_ENTRY(IDispatch)
    COM_INTERFACE_ENTRY(ISupportErrorInfo)
END_COM_MAP( )
public:
    // IExampleObjectBase interface ----------------------------------------------------------------
    STDMETHOD(Commit)(VOID) throw( );
    STDMETHOD(Restore)(VOID) throw( );
    STDMETHOD(SchemaType)(OUT BSTR * pbstrType) throw( )
      {
      TryOLE
         CheckWritePtr(pbstrType);
         *pbstrType = ::SysAllocString(L"LearningObject");
         if (!pbstrType)
            Throw(E_OUTOFMEMORY);
      CatchReturnOLE(ExampleLearningObject)
      }
    STDMETHOD(Lock_)(IN BSTR bstrIn) throw( )
      {
      FNoThrow( );
      TryOLE
         this->Base_Lock_(bstrIn);
      CatchReturnOLE(ExampleLearningObject)
      }
    STDMETHOD(Location)(OUT VARIANT * pvarLocation) throw( )
      {
      FNoThrow( );
      TryOLE
         this->Base_Location(pvarLocation);
      CatchReturnOLE(ExampleLearningObject)
      }
    STDMETHOD(Views)(OUT VARIANT * pvarViewObject) throw( )
      {
      FNoThrow( );
      TryOLE
         this->Base_Views(pvarViewObject);
      CatchReturnOLE(ExampleLearningObject)
      }
    STDMETHOD(GetValueByName)(IN BSTR     in_bstr-
                                          Property,
                                          OUT
                                          VARIANT
                                          *out_pvar-
                                          Value)
                                          throw( );
    STDMETHOD(PutValueByName)(IN BSTR     in_bstr-
                                          Property,
                                          OUT
                                          VARIANT
                                          in_var-
                                          Value)
                                          throw( );
    STDMETHOD(GetXML)(OUT BSTR * pbstrXML) throw( )
      {
      FNoThrow( );
```

-continued

```
        TryOLE
            this->Base_GetXML(this, pbstrXML);
        CatchReturnOLE(ExampleLearningObject)
        }
    STDMETHOD(SetXML)(IN BSTR bstrXML) throw( )
        {
        FNoThrow( );
        TryOLE
            this->Base_SetXML(this, bstrXML);
        CatchReturnOLE(ExampleLearningObject)
        }
    STDMETHOD(GetXMLPresentation)(OUT BSTR * pbstrXML) throw( )
        {
        FNoThrow( );
        TryOLE
            this->Base_GetXMLPresentation(pbstrXML);
        CatchReturnOLE(ExampleLearningObject)
        }
    // IExampleObjectPrivate interface ----------------------------------------------------------
    STDMETHOD(GetProperties)(OUT BSTR * pbstrProps) throw( )
        {
        FNoThrow( );
        TryOLE
            ::CheckWritePtr(pbstrProps);
            *pbstrProps =
::SysAllocString(L"Alias;Name;HomePage;OtherPages;");
            if (!*pbstrProps)
                Throw(E_OUTOFMEMORY);
        CatchReturnOLE(ExampleLearningObject)
        }
    STDMETHOD(Collection)(IN IExampleOrderedCollection *pIMOCCollection);
    STDMETHOD(CloseObjectStore)( )
        {
        FNoThrow( );
        return S_OK;
        }
    // CNotifyCallback interface ----------------------------------------------------------
    virtual bool Notify(IN eExampleObjectPropChange eChange,
                                                IN CWSZ
                                                cwszProp-
                                                Name,
                                                IN VARI-
                                                ANT&
                                                rvarNew-
                                                Value)
throw(CExampleException)
        {
        FCanThrowMex( );
        IExampleObjectManager * pimom = this->GetObjectManagerWEAK( );
        Assert(pimom);
        CComBSTR sbstrClass(L"LearningObject");
        CComBSTR sbstrProperty(cwszPropName);
        return (S_OK ==
                                    CheckHresultOLE(pimom->NotifyPropertyChange(this-
>GetUnknown( ),
                            sbstrClass,
                            sbstrProperty,
                            eChange,
                            &rvarNewValue),
                                                pimom,
IID_IExampleObjectManager));
        }
    // IExampleLearningObject interface ----------------------------------------------------------
    STDMETHOD(get_Alias)(OUT VARIANT * pValue) throw( );
    STDMETHOD(put_Alias)(IN VARIANT Value) throw( );
    STDMETHOD(get_Name)(OUT VARIANT * pValue) throw( );
    STDMETHOD(put_Name)(IN VARIANT Value) throw( );
    STDMETHOD(get_HomePage)(OUT VARIANT * pValue) throw( );
    STDMETHOD(put_HomePage)(IN VARIANT Value) throw( );
    STDMETHOD(get_OtherPages)(OUT VARIANT * pvarCollection) throw( );
    STDMETHOD(GetHomePageURL)(OUT VARIANT * pvarURL) throw( );
private:
    // private member variables ----------------------------
    CComVariant        m_Alias
    CComVariant        m_Name
    CComVariant        m_HomePage;
    CTypedCollection<IExampleCoreObject>       m_OtherPages;
};
```

```
/***********************************************************************
**
**
**       Auto-generated IDL file for Example schema interfaces.
**
***********************************************************************/
/***********************************************************************
**
**       IExampleCoreObject
**
***********************************************************************/
    [
        object,
        uuid(416E6479-4E69-6368-6F6C-736F6C414C4E),
        dual,
        helpstring("IExampleCoreObject Interface"),
        pointer_default(unique)
    ]
    interface IExampleCoreObject : IExampleObjectBase
    {
        [propget, id(12), helpstring("property Guid")]
            HRESULT Guid([out, retval] VARIANT * pValue);
        [propput, id(12), helpstring("property Guid")]
            HRESULT Guid([in] VARIANT Value);
        [propget, id(13), helpstring("property FriendlyName")]
            HRESULT FriendlyName([out, retval] VARIANT * pValue);
        [propput, id(13), helpstring("property FriendlyName")]
            HRESULT FriendlyName([in] VARIANT Value);
        [propget, id(14), helpstring("property URL")]
            HRESULT URL([out, retval] VARIANT * pValue);
        [propput, id(14), helpstring("property URL")]
            HRESULT URL([in] VARIANT Value);
    };
/***********************************************************************
**
**       IExampleLearningObject
**
***********************************************************************/
    [
        object,
        uuid(544F4d56-4100-2B2B-0044-4B4F53424945),
        dual,
        helpstring("IExampleLearningObject Interface"),
        pointer_default(unique)
        ]
        interface IExampleLearningObject : IExampleObjectBase
        {
        [propget, id(12), helpstring("property Alias")]
            HRESULT Alias([out, retval] VARIANT * pValue);
        [propput, id(12), helpstring("property Alias")]
            HRESULT Alias([in] VARIANT Value);
        [propget, id(13), helpstring("property Name")]
            HRESULT Name([out, retval] VARIANT * pValue);
        [propput, id(13), helpstring("property Name")]
            HRESULT Name([in] VARIANT Value);
        [propget, id(14), helpstring("property HomePage")]
            HRESULT HomePage([out, retval] VARIANT * pValue);
        [propput, id(14), helpstring("property HomePage")]
            HRESULT HomePage([in] VARIANT Value);
        [propget, id(15), helpstring("property OtherPages")]
            HRESULT OtherPages([out, retval] VARIANT * pvarCollection);
        [id(16), helpstring("method Returns the absolute URL of the Learning Object home page.")]
            HRESULT GetHomePageURL([out, retval] VARIANT * pvarURL);
    };

/***********************************************************************
**
**       Example Schema Objects for Type Library
**
***********************************************************************/
    // ExampleCoreObject
    [
        uuid(d6c88ee0-c411-4ba2-8e09-a476feb8ec75),
        helpstring("ExampleCoreObject Class"),
```

-continued

```
    noncreatable
]
coclass ExampleCoreObject
{
    [default] interface IExampleCoreObject;
};
// ExampleLearningObject
[
    uuid(3c85dcfe-3fe8-4d4f-870c-e076997e7be5),
    helpstring("ExampleLearningObject Class"),
    noncreatable
]
coclass ExampleLearningObject
{
[default] interface IExampleLearningObject;
};
```

We claim:

1. A method for updating one or more interface and database definitions of one or more database objects to enable compatibility between an interface and database utilizing the one or more updated definitions and to provide access to the one or more objects, the method comprising:

receiving schema definition data, the schema definition data including schema definitions defining at least one object in the database, wherein the schema definition defining the at least one object is different than at least one of a corresponding database definition and a corresponding interface definition for the at least one object;

parsing the schema definition data into collection classes comprising one or more schema objects;

examining each of the one or more schema objects in the collection classes and generating one or more corresponding database table definitions, such that the schema definition data is automatically propagated directly into the database definitions;

generating source code and an interface definition file corresponding to the at least one schema object; and compiling the source code and interface definition into component objects that are compatible with the database table definitions, the component objects providing run-time interfaces for manipulating data in the database as defined by the database table definitions.

2. The method of claim 1, wherein the collection classes are ordered according to a dependency relationship among the at least one object in the collection class of objects.

3. The method of claim 1, wherein receiving the schema definition data includes receiving a file formatted according to an XML (eXtensible Markup Language) standard and wherein parsing the schema definition data includes creating an XML parse tree.

4. The method of claim 1, wherein the updated database definition is generated with SQL code.

5. The method of claim 1, wherein the source code includes C++ code.

6. The method of claim 5, wherein the generated C++ code conforms to the COM standard.

7. The method of claim 1, wherein the source code includes an IDL (Interface Definition Language) file.

8. A method as recited in claim 1, wherein the schema definition data is automatically propagated directly into the database definitions without having to first depend on changes made to the component objects.

9. A computer program product including one or more computer readable media having computer-executable instructions for implementing a method for updating one or more interface and database definitions of one or more database objects to enable compatibility between an interface and database utilizing the one or more updated definitions and to provide access to the one or more objects, the method comprising:

receiving schema definition data, the schema definition data including schema definitions defining at least one object in the database, wherein the schema definition defining the at least one object is different than at least one of a corresponding database definition and a corresponding interface definition for the at least one object;

parsing the schema definition data into collection classes comprising one or more schema objects;

examining each of the one or more schema objects in the collection classes and generating one or more corresponding database table definitions, such that the schema definition data is automatically propagated directly into the database definitions;

generating source code and an interface definition file corresponding to the at least one schema object; and compiling the source code and interface definition into component objects that are compatible with the database table definitions, the component objects providing run-time interfaces for manipulating data in the database as defined by the database table definitions.

10. The computer program product of claim 9, wherein the collection classes are ordered according to a dependency relationship among the at least one object in the collection class of objects.

11. The computer program product of claim 9, wherein receiving the schema definition data includes receiving a file formatted according to an XML (eXtensible Markup Language) standard and wherein parsing the schema definition data includes creating an XML parse tree.

12. The computer program product of claim 9, wherein the updated database definition is generated with SQL code.

13. The computer program product of claim 9, wherein the source code includes C++ code.

14. The computer program product of claim 13, wherein the generated C++ code conforms to the COM standard.

15. The computer program product of claim 9, wherein the source code includes an IDL (Interface Definition Language) file.

16. The computer program product of claim 9, wherein the schema definition data is automatically propagated directly into the database definitions without having to first depend on changes made to the component objects.

* * * * *

UNITED STATES PATENT AND TRADEMARK OFFICE
CERTIFICATE OF CORRECTION

PATENT NO. : 6,631,519 B1
DATED : October 7, 2003
INVENTOR(S) : Nicholson et al.

It is certified that error appears in the above-identified patent and that said Letters Patent is hereby corrected as shown below:

Column 2,
Line 17, before "and disadvantages," please delete "shortcoming" and insert
-- shortcomings --

Column 3,
Line 8, after "detailed" please delete "."

Column 4,
Line 2, after "ROM" please delete "20" and insert -- 24 --

Column 8,
Line 67, after "first in the" please delete "-"

Signed and Sealed this

Sixth Day of July, 2004

JON W. DUDAS
*Acting Director of the United States Patent and Trademark Office*